United States Patent
Lalouani et al.

(10) Patent No.: US 12,482,560 B2
(45) Date of Patent: Nov. 25, 2025

(54) ENERGY-EFFICIENT COLLECTION OF WEARABLE SENSOR DATA

(71) Applicant: Lasarrus Clinic and Research Center, Middle River, MD (US)

(72) Inventors: Wassila Lalouani, Catonsville, MD (US); Mohamed Younis, Catonsville, MD (US); Roland N. Emokpae, Jr., Middle River, MD (US); Lloyd E. Emokpae, Middle River, MD (US)

(73) Assignee: Lasarrus Clinic and Research Center, Middle River, MD (US)

( * ) Notice: Subject to any disclaimer, the term of this patent is extended or adjusted under 35 U.S.C. 154(b) by 829 days.

(21) Appl. No.: 17/727,391

(22) Filed: Apr. 22, 2022

(65) Prior Publication Data

US 2022/0359070 A1    Nov. 10, 2022

Related U.S. Application Data

(60) Provisional application No. 63/178,956, filed on Apr. 23, 2021.

(51) Int. Cl.
*H03M 7/00* (2006.01)
*A61B 5/00* (2006.01)
(Continued)

(52) U.S. Cl.
CPC ........... *G16H 40/67* (2018.01); *A61B 5/0006* (2013.01); *A61B 5/0024* (2013.01); *G06F 1/163* (2013.01)

(58) Field of Classification Search
CPC ........ A61B 2562/0219; A61B 5/02416; A61B 5/0205; A61B 5/725; A61B 5/7267;
(Continued)

(56) References Cited

U.S. PATENT DOCUMENTS 8,340,740 B2   12/2012   Holzer et al.
8,547,982 B2   10/2013   Sultan et al.
(Continued)

FOREIGN PATENT DOCUMENTS

RU   2752137 C1   7/2021

OTHER PUBLICATIONS

A distributed real-time data prediction and adaptive sensing approach for wireless sensor networks, https://hal.archives-ouvertes.fr/hal-01948895/document.
(Continued)

*Primary Examiner* — Linh V Nguyen
(74) *Attorney, Agent, or Firm* — U. Maryland Carey School of Law MIPLRC/IPEC

(57) ABSTRACT

A wearable garment with sensors attached to obtain physiological data. The sensors are incorporated to form a body area sensor network to obtain the data. This provides patients with improved health monitoring by aggregating multiple interconnected nodes on a human body for sensorimotor measurements and provides patients with quantitative measurements of their progress. The data is obtained in a way that allows for the number of transmissions to be reduced thereby conserving the energy of the wearable devices. This is made possible by each sensor reducing the number of samples by eliminating predictable samples and configuring the sensors to pack the data efficiently. A neural network can determine whether a sample can be skipped or needs to be reported. A long short term memory architecture creates a waveform for a given snapshot of samples based on the previous samples regardless of whether these samples were reported or predicted.

5 Claims, 11 Drawing Sheets

(51) Int. Cl.
  *G06F 1/16* (2006.01)
  *G16H 40/67* (2018.01)
(58) Field of Classification Search
  CPC .......... A61B 2562/0271; A61B 5/0022; A61B 5/0024; A61B 5/02438; A61B 5/0816; A61B 5/087; A61B 5/1112; A61B 5/1117; A61B 5/112; A61B 5/6807; A61B 5/6823; A61B 5/746; A61B 2562/0204; A61B 2562/0233; A61B 2562/0247; A61B 2562/0261; A61B 5/0008; A61B 5/0013; A61B 5/0035; A61B 5/0036; A61B 5/0046; A61B 5/0059; A61B 5/015; A61B 5/02055; A61B 5/053; A61B 5/0531; A61B 5/0535; A61B 5/08; A61B 5/0803; A61B 5/0823; A61B 5/091; A61B 5/11; A61B 5/1114; A61B 5/1115; A61B 5/1128; A61B 5/1135; A61B 5/14542; A61B 5/4848; A61B 5/486; A61B 5/6822; A61B 5/6889; A61B 5/72; A61B 5/7203; A61B 5/7207; A61B 5/721; A61B 5/7275; A61B 5/7278; A61B 5/7282; A61B 5/743; A61B 5/7455; A61B 7/003; G16H 50/20; G16H 50/70; G16H 50/80; G16H 30/40; G16H 40/67; G16H 10/60; G16H 20/10; G16H 20/30; G16H 20/40; G16H 30/20; G16H 40/40; G16H 40/63; G16H 50/50; H03M 7/30
  USPC ....................................... 341/51; 600/42–429
  See application file for complete search history.

(56) References Cited

U.S. PATENT DOCUMENTS

| | | | |
|---|---|---|---|
| 9,582,072 B2 | 2/2017 | Connor | |
| 9,687,208 B2 | 6/2017 | Tsai et al. | |
| 9,888,868 B2 | 2/2018 | Sarrafzadeh et al. | |
| 10,028,675 B2 | 7/2018 | Patel et al. | |
| 10,327,698 B2 | 6/2019 | Biswas et al. | |
| 10,456,604 B2 | 10/2019 | Cheatham, III et al. | |
| 10,542,889 B2 | 1/2020 | Ramesh et al. | |
| 10,661,010 B1 | 5/2020 | Tsinberg | |
| 10,671,838 B1 | 6/2020 | Bogan, III et al. | |
| 10,709,353 B1 | 7/2020 | McLane | |
| 10,720,151 B2 | 7/2020 | Sypniewski et al. | |
| 10,751,003 B2* | 8/2020 | Munoz | A61B 5/02416 |
| 10,765,399 B2 | 9/2020 | Emmanouilidou et al. | |
| 10,898,160 B2 | 1/2021 | Spina et al. | |
| 10,966,681 B2 | 4/2021 | Datta et al. | |
| 11,089,995 B2 | 8/2021 | Mlynczak et al. | |
| 11,145,400 B1 | 10/2021 | Neumann et al. | |
| 11,179,060 B2 | 11/2021 | Odame et al. | |
| 11,272,864 B2 | 3/2022 | Dwarika | |
| 11,307,064 B2 | 4/2022 | Choi et al. | |
| 11,308,619 B2 | 4/2022 | Sainz de Cea et al. | |
| 11,406,330 B1* | 8/2022 | Baldwin | A61B 5/0077 |
| 11,484,211 B2 | 11/2022 | Shallom | |
| 12,138,044 B2* | 11/2024 | Soreefan | A61B 5/6889 |
| 2008/0281220 A1 | 11/2008 | Sharifpour | |
| 2009/0131758 A1 | 5/2009 | Heywood et al. | |
| 2011/0034818 A1 | 2/2011 | Gat et al. | |
| 2011/0125044 A1 | 5/2011 | Rhee et al. | |
| 2012/0283598 A1 | 11/2012 | Horii et al. | |
| 2013/0030258 A1 | 1/2013 | Cheung et al. | |
| 2014/0126732 A1 | 5/2014 | West et al. | |
| 2015/0351690 A1 | 12/2015 | Toth et al. | |
| 2016/0317097 A1* | 11/2016 | Adams | A61B 5/02416 |
| 2017/0143977 A1 | 5/2017 | Kaib et al. | |
| 2017/0156680 A1 | 6/2017 | Barretto et al. | |
| 2017/0157430 A1 | 6/2017 | Cheatham, III et al. | |
| 2017/0161451 A1 | 6/2017 | Weinstein | |
| 2017/0231528 A1 | 8/2017 | Nathan | |
| 2017/0347969 A1 | 12/2017 | Thakur et al. | |
| 2018/0015282 A1* | 1/2018 | Waner | A61B 5/00 |
| 2018/0035901 A1 | 2/2018 | Cronin et al. | |
| 2018/0047200 A1 | 2/2018 | O'Hara et al. | |
| 2018/0139518 A1 | 5/2018 | Touma et al. | |
| 2019/0076080 A1 | 3/2019 | Prado | |
| 2019/0088367 A1 | 3/2019 | Stamatopoulos et al. | |
| 2019/0134396 A1 | 5/2019 | Toth et al. | |
| 2019/0151640 A1 | 5/2019 | Weber et al. | |
| 2019/0167176 A1 | 6/2019 | Annoni et al. | |
| 2019/0167927 A1 | 6/2019 | Dagnello et al. | |
| 2019/0231262 A1 | 8/2019 | Nasry | |
| 2019/0266491 A1 | 8/2019 | Gao et al. | |
| 2019/0266723 A1 | 8/2019 | Blanchard et al. | |
| 2019/0298987 A1 | 10/2019 | Freeman et al. | |
| 2019/0302460 A1 | 10/2019 | Kaul et al. | |
| 2019/0365263 A1 | 12/2019 | Raj et al. | |
| 2020/0093459 A1 | 3/2020 | Rahman et al. | |
| 2020/0176114 A1* | 6/2020 | Badawi | G16H 50/20 |
| 2020/0183047 A1 | 6/2020 | Denli et al. | |
| 2020/0218786 A1* | 7/2020 | Gurev | G06N 20/00 |
| 2020/0337639 A1* | 10/2020 | Ruddock | G09B 19/0038 |
| 2021/0034921 A1 | 2/2021 | Pinkovich et al. | |
| 2021/0043321 A1 | 2/2021 | Deterding et al. | |
| 2021/0045656 A1 | 2/2021 | Rahman et al. | |
| 2021/0110927 A1* | 4/2021 | Kerman | G06N 3/045 |
| 2021/0113099 A1 | 4/2021 | Rogers et al. | |
| 2021/0128074 A1 | 5/2021 | Leydon | |
| 2021/0169326 A1 | 6/2021 | Emokpae | |
| 2021/0201526 A1* | 7/2021 | Moloney | G06N 3/084 |
| 2021/0275023 A1 | 9/2021 | Kalantarian et al. | |
| 2021/0315480 A1 | 10/2021 | Odame et al. | |
| 2021/0345939 A1 | 11/2021 | Jumbe | |
| 2021/0353244 A1 | 11/2021 | Kiely | |
| 2021/0369232 A1 | 12/2021 | Chen et al. | |
| 2021/0398683 A1 | 12/2021 | Clifford et al. | |
| 2021/0402212 A1 | 12/2021 | Schupp et al. | |
| 2022/0005601 A1 | 1/2022 | Cox et al. | |
| 2022/0039757 A1* | 2/2022 | Catani | G06N 3/09 |
| 2022/0068476 A1 | 3/2022 | Link et al. | |
| 2022/0122728 A1 | 4/2022 | Wahl et al. | |
| 2022/0248966 A1* | 8/2022 | Freeman | A61B 5/7282 |
| 2023/0177217 A1 | 6/2023 | Hughes | |
| 2023/0225695 A1 | 7/2023 | Dodson et al. | |
| 2023/0270350 A1 | 8/2023 | Shouldice et al. | |
| 2024/0032859 A1* | 2/2024 | Kanegae | A61B 5/4812 |

OTHER PUBLICATIONS

Classifier-Based Data Transmission Reduction in Wearable Sensor Network for Human Activity Monitoring https://www.ncbi.nlm.nih.gov/pmc/articles/PMC7795086/pdf/sensors-21-00085.pdf.

Altan, G., Kutlu, Y., & Allahverdi, N. (2019). Deep learning on computerized analysis of chronic obstructive pulmonary disease. *IEEE journal of biomedical and health informative*, 24(5), 1344-1350.

Darwish, A., & Hassanien, A. E. (2011). Wearable and implantable wireless sensor network solutions for healthcare monitoring. *Sensors*, 11(6), 5561-5595.

Emokpae, L. E., Emokpae Jr, R. N., Bowry, E., Bin Saif, J., Mahmud, M., Lalouani, W., . . . & Joyner Jr, R. L. (2022). A wearable multi-modal acoustic system for breathing analysis. *The Journal of the Acoustical Society of America*, 151(2), 1033-1038.

Fernandez-Granero, M. A., Sanchez-Morillo, D., & Leon-Jimenez, A. (2015). Computerised analysis of telemonitored respiratory sounds for predicting acute exacerbations of COPD. *Sensors*, 15(10), 26978-26996.

Hawthorne, G., Greening, N., Esliger, D., Briggs-Price, S., Richardson, M., Chaplin, E., . . . & Orme, M. W. (2022). Usability of wearable multiparameter technology to continuously monitor free-living vital signs in people living with chronic obstructive pulmonary disease: prospective observational study. *JMIR Human Factors*, 9(1), e30091.

Hsu, F. S., Huang, S. R., Huang, C. W., Huang, C. J., Cheng, Y. R., Chen, C. C., . . . & Lai, F. (2021). Benchmarking of eight recurrent

(56) References Cited

OTHER PUBLICATIONS neural network variants for breath phase and adventitious sound detection on a self-developed open-access lung sound database—HF_Lung_V1. PLoS *One*, 16(7), e0254134.

Islam, B., Rahman, M. M., Ahmed, T., Ahmed, M. Y., Hasan, M. M., Nathan, V., . . . & Gao, J. A. (2021). BreathTrack: detecting regular breathing phases from unannotated acoustic data captured by a smartphone. *Proceeding of the ACM on Interactive, Mobile, Wearable and Ubiquitous Technologies*, 5(3), 1-22.

Pervez Khan, M. A. H., & Kwak, K. S. (2009). Medical applications of wireless body area networks. International *Journal of Digital Content Technology and its Applications*, 3(3), 185-93.

Kemalasari et al, Medical Spirometer for Diagnosing COPD Base on The Measurement of FVC and FEV1, 2020 *J. Phys.*: Conf. Ser. 1569 032061.

Kumar, A., Mitra, V., Oliver, C., Ullal, A., Biddulph, M., & Mance, I. (Nov. 2021). Estimating respiratory rate from breath audio obtained through wearable microphones. In *2021 43rd Annual International Conference of the IEEE Engineering in Medicine & Biology Society* (*EMBC*) (pp. 7310-7315). IEEE.

Lalouani, W., Younis, M., Emokpae Jr, R. N., & Emokpae, L.E. (2022). Enabling effective breathing sound analysis for automated diagnosis of lung diseases. *Smart Health*, 26, 100329.

Larson, E. C., Goel, M., Boriello, G., Heltshe, S., Rosenfeld, M., & Patel, S. N. (Sep. 2012). SpiroSmart: using a microphone to measure lung function on a mobile phone. In *Proceedings of the 2012 ACM Conference on ubiquitous computing* (pp. 280-289).

Lee, S. H., Kim, Y.S., Yeo, M. K., Mahmood, M., Zavanelli, N., Chung, C., . . . & Yeo, W. H. (2022). Fully portable continuous real-time auscultation with a soft wearable stethoscope designed for automated disease diagnosis. *Science Advances*, 8(21), eabo5867.

Majumder AK. Computer Analysis of Frequency Spectrum of the Phonopulmogram. *Proc Annu Symp Comput Appl Med Care*. Nov. 5, 1980; 1:266-71. PMCID: PMC2203739.

Messner, E., Fediuk, M., Swatek, P., Scheidl, S., Smolle-Jüttner, F. M., Olschewski, H., & Pernkopf, F. (2020). Multi-channel lung sound classification with convolutional recurrent neural networks. Computers *in Biology and Medicine*, 122, 103831.

Rahman, M. M., Ahmed, T., Nemati, E., Nathan, V., Vatanparvar, K., Blackstock, E., & Kuang, J. (Mar. 2020). Exhalesense: Detecting high fidelity forced exhalations to estimate lung obstruction on smartphones. In *2020 IEEE International Conference on Pervasive Computing and Communications* (*PerCom*) (pp. 1-10). IEEE.

Viswanath, V., Garrison, J., & Patel, S. (Jul. 2018). SpiroConfidence: determining the validity of smartphone based spirometry using machine learning. In 2018 *40th Annual International Conference of the IEEE Engineering in Medicine and Biology Society* (*EMBC*) (pp. 5499-5502). IEEE.

Vito, D. (2012). A new system for tailoring and monitoring mechanical ventilation by a wearable device at home, Chapter 3, "Materials and Methods." Downloaded Jun. 10, 2024 from https://www.politesi.polimi.it/bitstream/10589/65161/5/2012_10_Vito.pdf.

Wu, L., & Li, L. (Jul. 2020). Investigating into segmentation methods for diagnosis of respiratory diseases using adventitious respiratory sounds. In 2020 *42nd Annual International Conference of the IEEE Engineering in Medicine & Biology Society* (*EMBC*) (pp. 768-771). IEEE.

Xu, W., Huang M. C., Liu, J. J., Ren, F., Shen, X., & Sarrafzadeh, M. (May 2013). mCOPD: mobile phone based lung function diagnosis and exercise system for COPD. In *Proceeding of the 6th International Conference on Pervasive Technologies Related to Assistive Environments* (pp. 1-8).

Zubaydi, F., Sagahyroon, A., Aloul, F., Mir, H., & Mahboub, B. (Dec. 2020). Using mobiles to monitor respiratory diseases. In *Informatics* (vol. 7, No. 4, p. 56). MDPI.

* cited by examiner

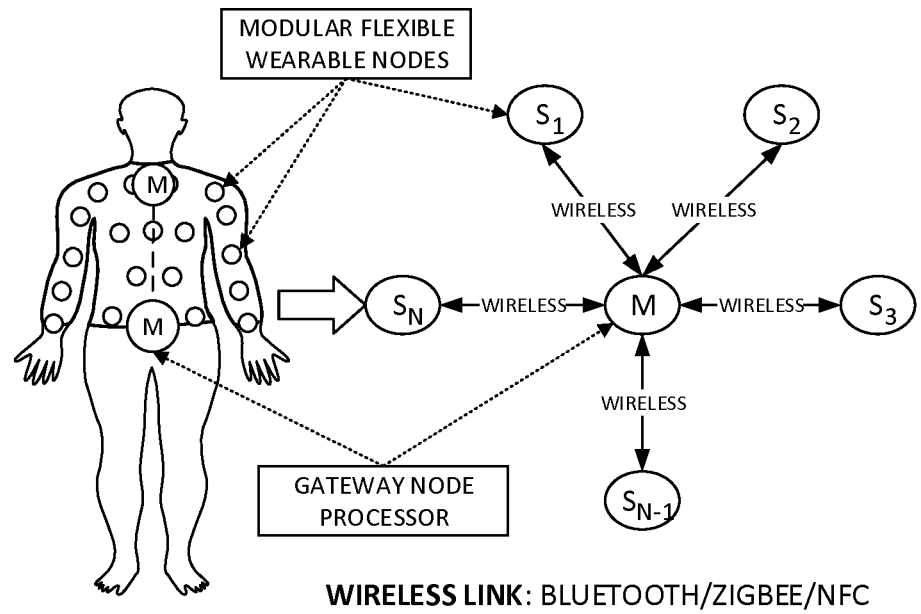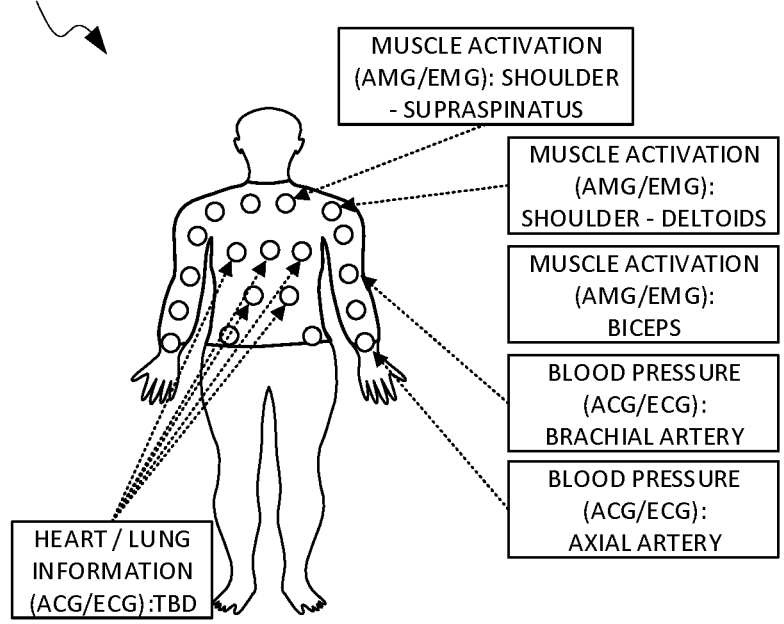
FIG. 1

1. Prepare the dataset and normalize it
2. Train the model
3. Extract the weights of the network
4. For each sample in $B$:
5.     Predict the sample using the LSTM.
6.     If the accuracy < Threshold:
7.         Insert the actual sample
8.     Else
9.         Mark the sample predicted
10. End for
11. Rescale the data
12. $T_{opt} = B$ // Optimal snapshot
13. For each snapshot $T$ in $[1, B]$
14.     Find smallest number of bits $S_{min}$ (quantization) that meet min accuracy for predicted samples
15.     $V = T + \lceil \log_2 T \rceil$ // Sample specification overhead
16.     $V = V + \lceil \log_2 \gamma \rceil$ // Quantization overhead
17.     $W_{min} = 1$ // least avg wasted space per packet
18.     $\gamma_{min} = S$ // Default quantization (sample size)
19.     For each $\gamma$ in $[S_{min}, S]$
20.         $N = \left\lceil \frac{V + T \times \gamma}{P_{max}} \right\rceil$ // minimum packet count $N$
21.         $W = (N \times P_{max} - V - T \times \gamma)/N$ // Waste/packet
22.         If $(W \leq W_{min})$ // If it is a better snapshot
23.             $W_{min} = W$
24.             $T_{opt} = T$
25.             $\gamma_{min} = \gamma$
26.     End for
27. End for
28. Form the packets using $T_{opt}$ and $N$ and send the data

FIG. 8

ENERGY-EFFICIENT COLLECTION OF WEARABLE SENSOR DATA

CROSS REFERENCE TO RELATED APPLICATIONS

This application claims the benefit of U.S. Provisional Application No. 63/178,956, filed Apr. 23, 2021, and incorporated herein by reference in its entirety.

BACKGROUND OF THE INVENTION

Field of the Invention

The present invention relates to wearable devices that detect physiological data efficiently.

Background Art

Wearable medical devices and the emergence of the Internet of Things (IoT) have revolutionized the healthcare industry (Riazul Islam et al. 2015; Nadeem et al. 2015). Particularly, these advanced technologies have enabled the development of effective and economic solutions for remote and continuous monitoring of patients with medical conditions. For example, the heartbeat of individuals can be measured to detect cardiac unrest and automatically call for emergency assistance. Such a monitoring service has traditionally been possible only through hospitals or specialized clinics, and consequently deemed both expensive for insurance companies and inconvenient for patients and their families. For health insurance providers, reducing costs is paramount to maintain affordable premiums. Moreover, wearable sensors are valuable for monitoring the body conditions under stress, e.g., while exercising or playing sports. The architecture of such a real-time health monitoring system consists of single or multi-modality sensing devices to collect relevant measurements and transmit them through a gateway node to storage centers, either cloud-based or private, to be accessible to caregivers.

Since the sensing devices will be wearable, i.e., attached on the body or as part of an apparel, they ought to be miniaturized and require low maintenance. Therefore, wearable sensors would rely on very small batteries or even scavenged energy from ambient sources. However, the operation of these wearable devices involves significant energy consumption due to the wireless transmission and high sampling rates required for collecting physiological data such as electrocardiography (ECG), electromyography (EMG), acoustic cardiography (ACG) and acoustic myography (AMG). Therefore, minimizing energy consumption is a major goal in the proper operation of a wearable sensor system.

Related Work

Contemporary optimization schemes can be classified into three categories: (i) low power circuit design (Karray et al. 2018), (ii) energy-aware communication protocols (Ali et al. 2019), and (iii) in-network data processing (Dehkordi et al 2020). The latter is generally an application-dependent methodology in the context of wearable sensors (Abiodun et al. 2017). A tradeoff is involved between the growth in computation overhead and the decrease in communication-related energy consumption. Compressive sensing is an example of such methodology where data reduction is sought to cut down on the number of transmissions at the expense of increased on-node signal processing (Al Disi et al. 2018).

Moreover, the following approaches are noteworthy:

Compression of IoT Data: Compressive sensing (CS) is widely used for extending the battery lifetime of wearable devices (Al Disi et al. 2018). In general, CS aims to digitize the sampled signal using fewer measurements than the Shannon-Nyquist rate. CS approaches in the literature either apply transformations or direct compression to the original signal (Qaisar et al. 2013; Djelouat 2018). Transformation based schemes change the signal representation using popular techniques such as Fourier descriptors, Walsh transform, Karhunen-Loeve transform and wavelet transform. Meanwhile, direct compression applies encoding techniques such as amplitude zone time epoch, turning point, coordinate reduction time, and differential pulse modulation. Although direct compression yields reconstructed signals, transformation based schemes may achieve a higher compression ratio. A survey and detailed taxonomy of CS in biomedical application can be found in (Khosravy & Duque 2020). There are also CS reconstruction algorithms that aim to reduce error-rates or address special remote sensing applications. Zhang and Rao (2013) have recently proposed a reconstruction algorithm that capitalizes on the signal structure and its intra-block correlation. Again, SPEO can be viewed as a complementary, rather than competing, optimization scheme to CS.

Deep learning for Biomedical IoT: In connected healthcare applications, data collection and data processing are usually the two main sensor-related functional components. Deep learning techniques have been traditionally used for data processing, but are rarely exploited for optimizing the data collection process. Most published work in such an area of research focuses on applying deep learning techniques for information extraction, behavior modeling, and phenotyping (Zemouri et al. 2019). For example, a deep belief network-based algorithm has been proposed in (Wu et al. 2016) to learn features from ECG data of arrhythmias patients. A. Abrishami et al. (2018) have focused on extracting spatial features from ECG signals to ensure automatic segmentation of heartbeat signals. Alternatively, some work considers the temporal features for disease or anomaly classification. This has been the approach taken by Yıldırım et al. (2018), where deep bidirectional LSTM network-based wavelet sequence encoding and decoding are exploited for decomposing and classifying ECG signals in order to determine symptoms of alcoholism in a person. In general ECG signal decomposition and classification do not allow accurate reconstruction of the original signal and consequently hinder analyzing the patient health status at the gateway node.

Energy-aware signal reconstruction and analysis: IoT based architectures have been leveraged for numerous medical applications, such as remote health monitoring, fitness programs, and elderly care (Riazul Islam et al. 2015). There have been studies that look at architectures for real-time monitoring of patient health conditions. Some studies have employed gateway nodes to establish connectivity to medical devices to cloud computing platforms (Moustafa 2016; Rahman 2018). Meanwhile others rely on portable devices with limited-capabilities. For example, Gradl et al. (2012) have demonstrated the feasibility of real-time ECG QRS detection, feature extraction, and heartbeat classification on smart portable devices. SPEO focuses on the energy optimization for collecting sensor samples by reducing the number of wireless transmissions, and can be integrated with any computation platform for conducting medical assessment. Energy efficient reconstruction of sensor signals has been the objective of a number of studies; yet the focus has been on conducting the analysis at the gateway node rather than at the sensor node. For example, an iterative shrinkage-thresholding algorithm is employed in (Kanoun et al. 2011) to reconstruct ECG signals on smart phones. Other work considers real-time energy efficient reconstruction using specifically designed microcontrollers. The idea is to exploit the distribution of information in sparse signals in order to reduce the number of samples that are needed for reliable data acquisition (Al Disi et al. 2018). While the computation cost is factored in is such category of work, the communication overhead is ignored.

BRIEF DESCRIPTION OF THE DRAWINGS/FIGURES

FIG. 1 illustrates a body area sensor network and sensor placement, according to an embodiment.

FIG. 8 shows pseudocode for sample prediction and packing, according to an embodiment.

FIG. 10 *a, b* show original and reconstructed ECG signals in an embodiment.

Figure 11:
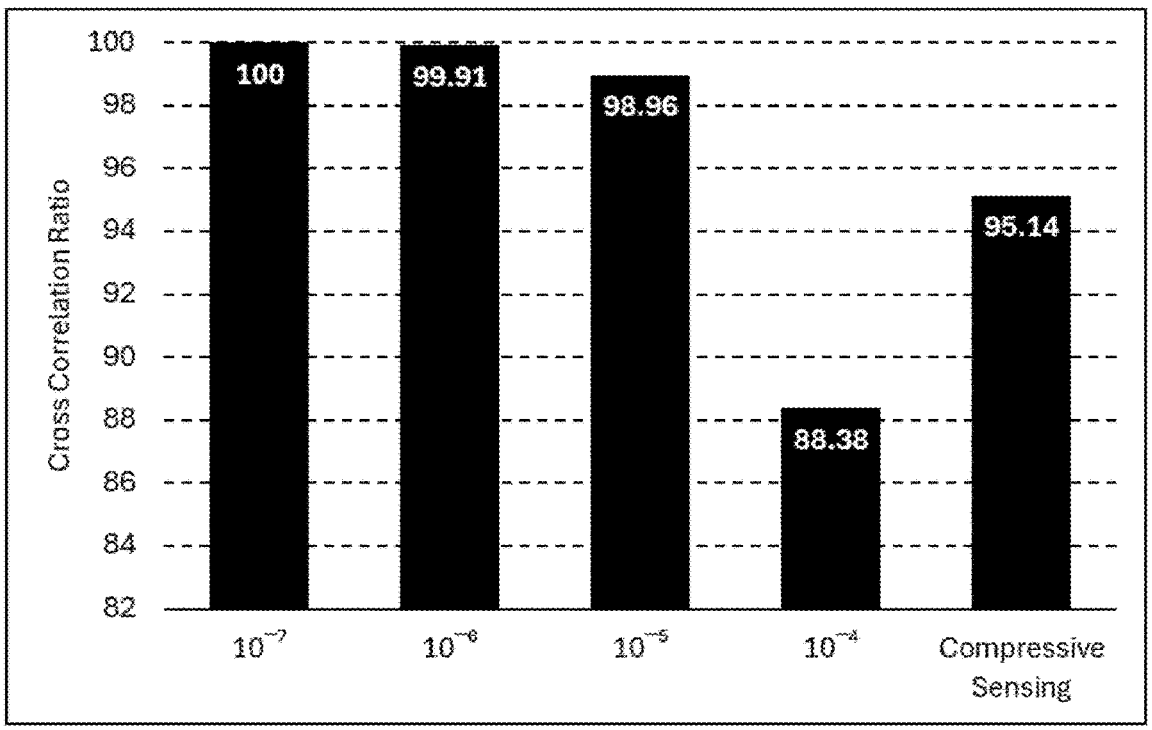

FIG. 11 is a graph showing the quality of a reconstructed signal in an embodiment.

Figure 12:
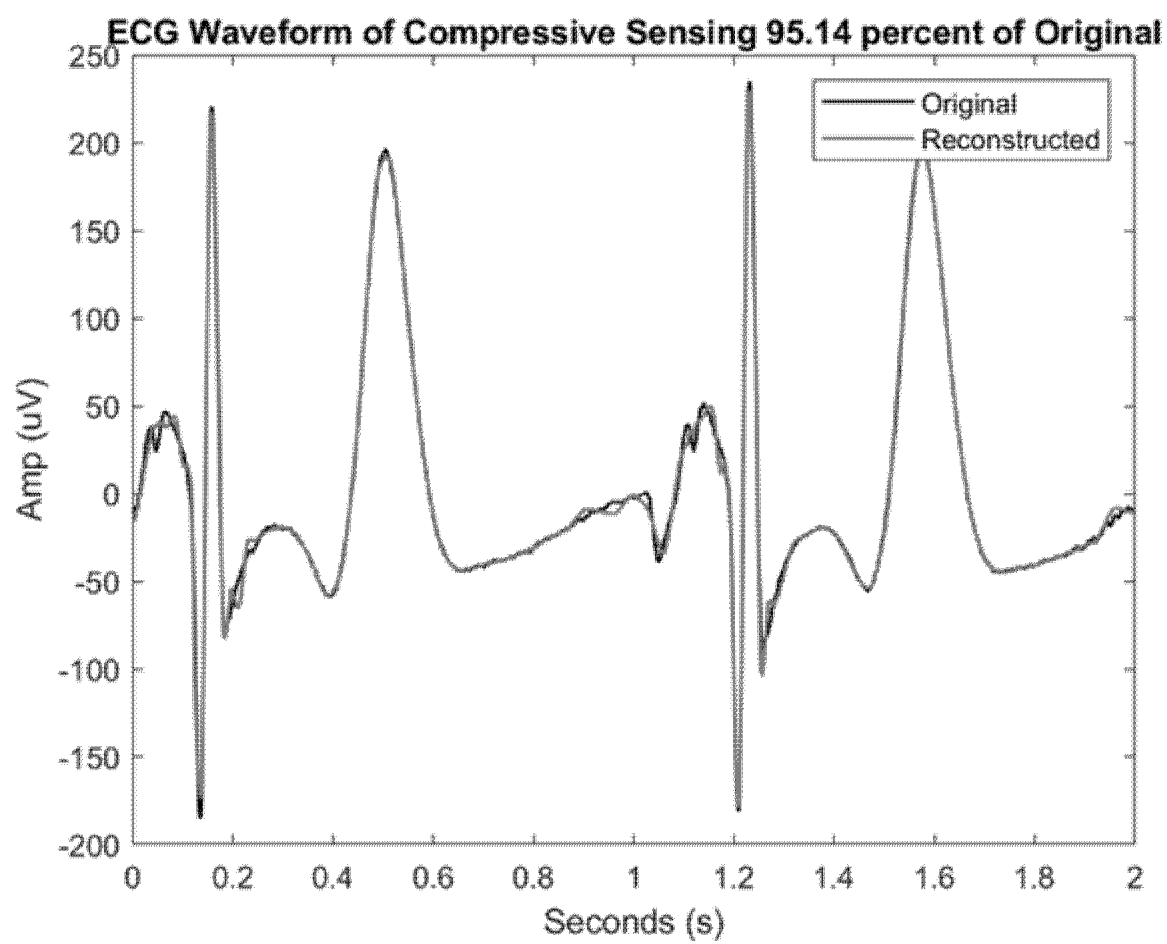

FIG. 12 is a graph showing an ECG waveform after compressive sensing.

Figure 13:
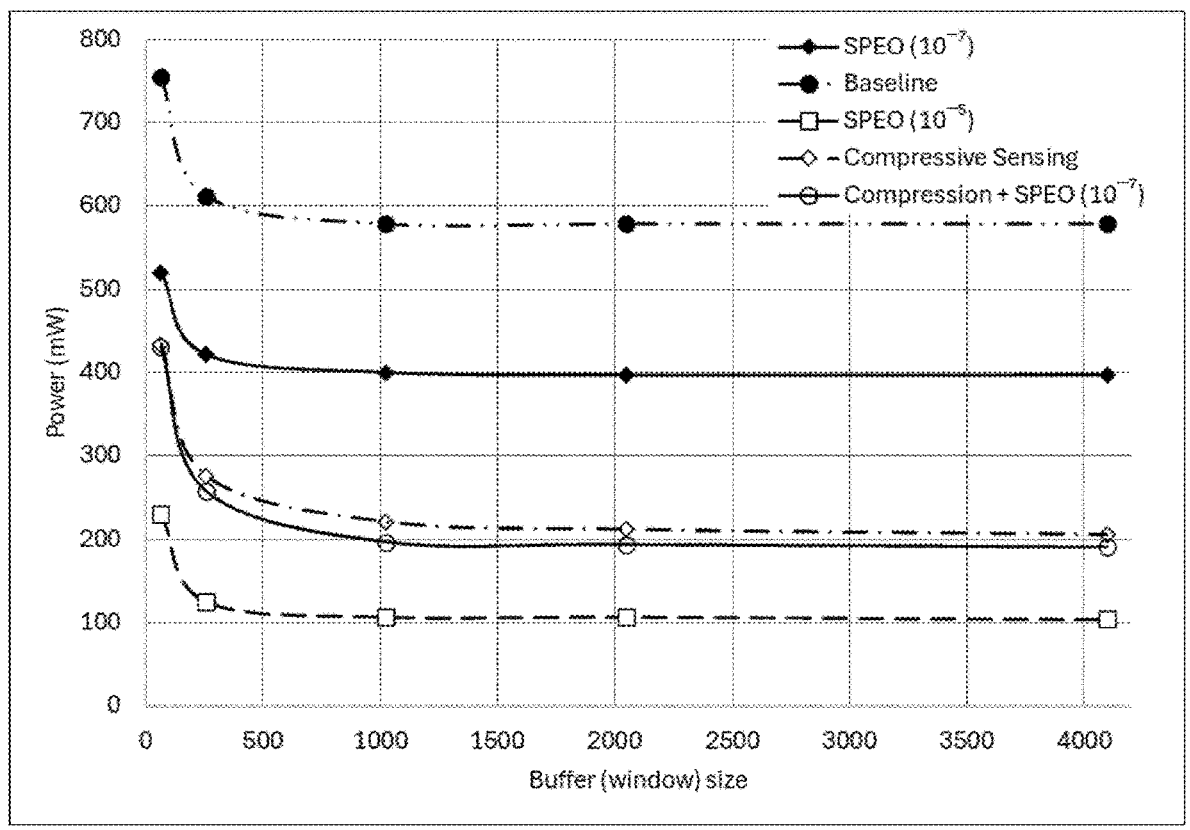

FIG. 13 is a graph showing the relationship of power consumption to buffer size according to an embodiment of the invention.

Further embodiments, features, and advantages of the present invention, as well as the operation of the various embodiments of the present invention, are described below with reference to the accompanying drawings.

DETAILED DESCRIPTION OF THE INVENTION

A preferred embodiment of the present invention is now described with reference to the figures. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

In this invention we may reduce the volume and frequency of data transmission from sensor nodes to a gateway node, by eliminating some of the sampled data and thereby reducing the volume of data sent to the gateway. We use advanced machine learning techniques to determine when data transmissions are skipped, and implicitly make the gateway aware of the omitted samples to achieve accurate signal reconstruction. This invention also presents a data quantization technique for increased throughput and reduced energy overhead while sustaining desired medical assessment accuracy. A packet formation algorithm is used to leverage the available buffering space to improve bandwidth and energy utilization subject to latency constraints.

In this invention, we focus on reducing the number of transmissions through in-network data processing. The objective is to conserve the energy of a wearable device by skipping some samples without degrading the accuracy of the physiological data so that the correctness of the diagnostics is sustained. Unlike contemporary schemes that consider certain signal characteristics and exploit similarities among samples, our approach limits the overhead of frequent sample transmission by enabling the sensor and the gateway to accurately forecast upcoming signal samples. We employ a recurrent neural network using long short-term memory (LSTM) at the communicating pair, i.e., sensor and gateway, to predict upcoming physiological data samples. By setting a certain variation threshold, the sensor may decide on skipping the transmission of a sample if the difference relative to the previous data sample is negligible. By running the same LSTM model at the gateway, missing certain samples can be anticipated and the corresponding data can be estimated. A major advantage of our approach is that the error bound for a reproduced data sample is easily controlled by adjusting the variation threshold and thus our approach can be applied to a wide range of sensor modalities. Furthermore, our approach does not suffer from error distortion of each reconstructed signal segment as the error are handled sequentially; any violation of the bound necessitates the transmission of the sample and consequently restoring the accuracy for further upcoming sample prediction.

To further reduce energy consumption and boost the throughput of transmissions to a gateway, we exploit the trade-off between the condition assessment accuracy for the monitored individual and the size and latency of the transmitted data. Basically, the quantization accuracy, i.e., the number of bits is optimized so that the fewest bits are included on a packet payload corresponding to the data samples. The device buffering capacity is also leveraged to pack as many data samples within a single packet and fully utilize the maximum allowed packet size and consequently reduce the energy consumed per transmitted sample. This also improves the bandwidth utilization for the wireless links. Overall, our approach can be seen as complementary for any compressive sensing algorithm and may be generically applied to various sensor modalities. The effectiveness of our sample prediction-based energy optimization (SPEO) approach is validated through simulation using publicly available ECG datasets. The simulation results demonstrate that our SPEO approach outperforms a prominent data compression scheme. In summary the contribution of the invention is as follows:

a. Employing advanced machine learning techniques to enable accurate signal reconstruction in the absence of a some of the data samples.

b. Developing a protocol to minimize energy consumption in collecting data from wearable devices by predicting the sample values at both communications ends.

c. Devising a data quantization technique for increased throughput and reduced energy overhead while sustaining desired medical assessment accuracy.
d. Developing a mechanism for packet formation that exploits the tradeoff between buffer size and data delivery latency to reduce overhead.
e. Demonstrating the synergistic effect of the proposed approach to contemporary data reduction techniques such as compressive sensing.
f. Validating the proposed techniques using large ECG datasets.

System Architecture

We consider a body area sensor network (BASN), which incorporates a mesh of sensors that are networked to measure full torso range of motion, muscle activation, and body vitals in the form of ECG, EMG, ACG and AMG for example and without limitation. Sensor data is disseminated from each sensor to a gateway node that either processes the data or forwards it to a remote healthcare facility. The system architecture is shown in FIG. 1, which depicts a wireless body area sensor network 110 with biofeedback, where the network integrates sensors S for health analysis and the sensors are in communication with a gateway M. Also illustrated is an example 120 of potential sensor node placement corresponding to desired physiological measurements. The BASN is assumed to employ a robust MAC protocol that ensures delivery of packets, e.g., by sending data packet acknowledgements. In this invention, we are assuming that each sensor node in the BASN will utilize the Digi XBee® 3 ZigBee standard for establishing wireless links.

BASNs have the potential for improved health monitoring by aggregating multiple interconnected nodes on a human body, for sensorimotor measurements for example. A BASN could provide a patient with quantitative measure of progress; such a measurement system currently does not exist in the practice of conventional rehabilitation, e.g., physical therapy. Without any quantitative data, the patient may face motivational challenges when improvements are subtle and gradual. Furthermore, without knowing the details of progress, it can be difficult to set and reach goals, for example a goal to improve shoulder abduction by 5% within 6 months. With the considered BASN, each modular wireless sensor node incorporates multimodal sensors (electrical, MEMS, and acoustics) for measuring both torso range of motion and the physiological state of the user that the specific integration point (shoulder, biceps, chest, back, etc.).

Approach Overview

Nodes in a BASN may need to operate on very limited battery capacities; therefore, minimizing energy consumption is critical to the sustained operation of the nodes and network. In that regard, radio transmissions impose the most energy overhead for the BASN nodes and is thus a prime target for optimization. SPEO seeks to conserve communication-related energy by: (1) avoiding transmission of data samples that can be implicitly inferred given prior samples and based on the specific sensor modality, and (2) reducing the number of sent packets by optimizing packet payload formation.

Figure 2:
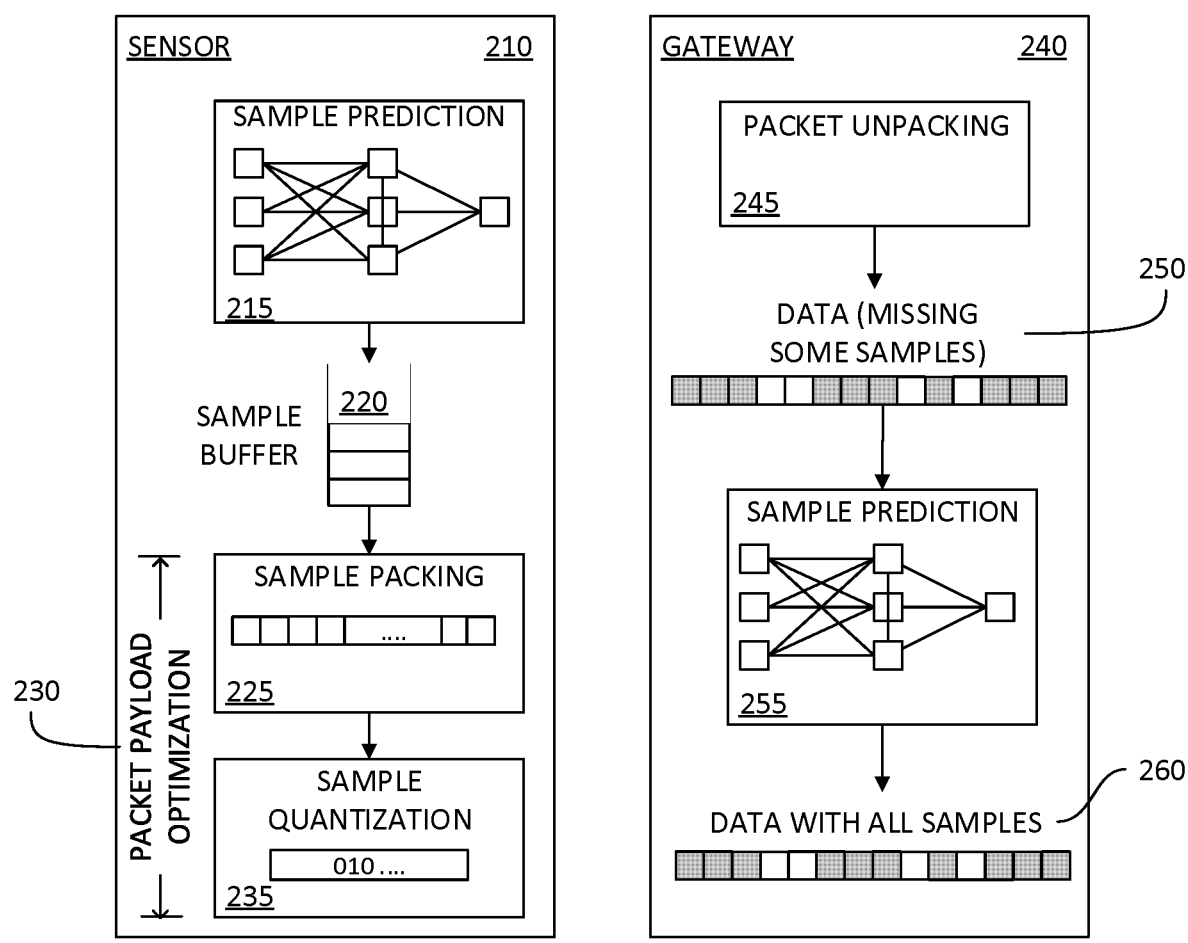
FIG. 2 is a block diagram showing processing at a sensor and at a gateway, according to an embodiment.

The sensor node may employ a machine learning model to assess whether a current sample can be predicted using the previous ones, subject to certain inaccuracy bound, and eliminated from transmission. Samples that can be accurately predicted are therefore skipped, while the rest are buffered to be sent to the gateway node. FIG. 2 provides an overview of the steps at both the wearable sensor and gateway nodes, according to an embodiment. This illustration depicts the process 210 at a sensor beginning with sample prediction at 215. Based on whether a sample is predictable, such a sample may be eliminated. Remaining samples may be buffered at 220. Next, the remaining samples may be packed at 225 and the formatting may be quantized at 235. The packing 225 and quantization 235 may be collectively viewed as a packet payload optimization process 230. The next block of FIG. 2 depicts the process 240 at the gateway node starting with packet unpacking 245, yielding data 250 which includes information indicating that some samples have been eliminated at the sensor before transmission. Missing samples are recreated at 255. In an embodiment this recreation process uses a neural network-based process. This yields the data 260 with all samples.

Figure 3:
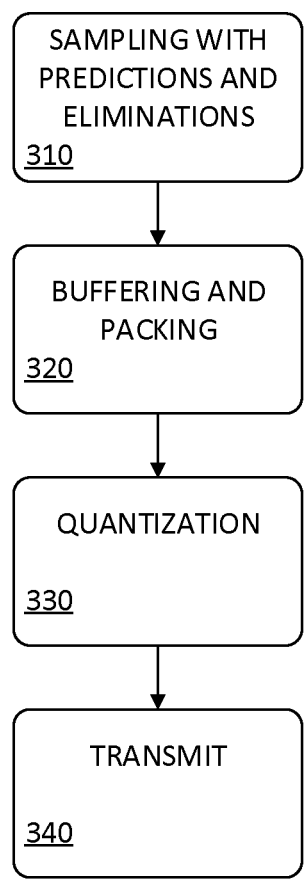
FIG. 3 is a flowchart showing processing at a sensor, according to an embodiment.

The buffered samples are in effect the payload of the transmitted packets. Payload formation is further optimized to conserve energy. The optimization 230 may be based on two techniques: (i) sample packing to fully utilize the maximum packet size, where our SPEO approach strives to include as many samples as feasible while informing the gateway about any skipped samples; and (ii) determining the minimum quantization accuracy (number of bits) for representing the samples without diminishing the application effectiveness. In essence, data sample buffering constitutes a tradeoff between data delivery latency and energy conservation. FIG. 3 illustrates at a high level the processing at the sensor. Sampling takes place, followed by determination that certain samples may be eliminated (310). Buffering and packing of remaining samples takes place at 320. The remaining samples go through a quantization process 330 and are ultimately transmitted to the gateway at 340.

Upon receiving a packet, the gateway will use the embedded information in the packet to determine the number and order of samples in the payload. The gateway may then apply the same sample prediction model employed by the sensors to estimate (approximately recreate) the missing samples. Overall, our proposed technique for energy-aware data collection is not specific to certain sensing modality. The next section describes our proposed techniques in greater detail.

Sample Prediction

To cut down on the number of transmissions from sensors to the gateway, and to conserve the energy of wearable devices, we propose a data sample prediction mechanism based on advanced machine learning models. This is based on the observation that if there are no serious health conditions, there is little variation in monitored physiological attributes and, consequently, little variation in the collected data. Thus, the transmission of some data samples may be skipped as long as no negative effect will be inflicted on the application, i.e., no health alerts will be missed. However, skipping samples raises two main issues:

(1) An assessment of the utility of a sample has to be conducted at the sensor level. Modality-specific sensor data processing may occur, involving multiple samples that precede the sample being assessed;

(2) The gateway node should be aware of any skipped samples. The samples may be time-stamped so that they can be correctly ordered and processed at the gateway. A missed sample could be attributed to packet loss over noisy wireless links or to failure at the sender (sensor) side. Gateway awareness can be a more pressing issue if skipping samples is not done on a regular basis, i.e., is sporadic over time, and if multiple consecutive samples are skipped. Therefore, the decision by a sensor to eliminate (i.e., not transmit) a sample should be expected and mitigated by the gateway.

To tackle the aforementioned issues, our SPEO approach applies a machine learning model at the sensor side; such a model is also replicated on the gateway node. Our model identifies the possibly predictable samples that may be inferred by the gateway. The analog sensing data from different modalities like ECG, EMG and AMG may exhibit known patterns constituting time series. We exploit such propriety to forecast a next sample from preceding samples; the accuracy of this predicted next sample is then assessed when the actual next sample is collected. A decision is made as to whether a transmission of the actual next sample is needed, i.e., if the actual next sample significantly deviates from the predicted next sample to warrant transmission of the actual next sample. An embodiment of the invention described herein leverages Recurrent Neural Networks (RNN), which proved to be effective for time series datasets (Djelouat et al. 2020). Particularly, we employ a Long Short-Term Memory (LSTM) network, which is a special type of RNN that is trained using backpropagation through time and overcomes the vanishing gradient issue of ordinary recurrent networks.

Instead of neurons, LSTM networks may employ memory blocks known as gates that are connected through layers. Gates operate upon an input sequence and may use a specific activation function to control whether a prior input is to be factored in (remembered) or be deemed outdated (forgotten). This in effect will control changes in the LSTM state and consequently the information flow. Those conditional gates can be either "forget", "input", or "output" gates. The forget gates decide which information to throw away from the block. An input gate decides which values from the input to update in the memory state. An output gate decides what to output based on input and the memory of the block. Each gate has weights that are learned during a training process.

Our LSTM network is constructed of one input layer, a single hidden layer with multiple LSTM cells, and an output layer. Our activation function is the sigmoid activation. The following are the operations performed in each prediction (Bianchi et al. 2017).

$$i_t = \sigma(W_i \cdot [H_{t-1}, x_t] + b_i) \quad (1)$$

$$f_t = \sigma(W_f \cdot [H_{t-1}, x_t] + b_f) \quad (2)$$

$$\check{C}_t = \tanh(W_C \cdot [H_{t-1}, x_t] + b_C) \quad (3)$$

$$C_t = C_{t-1} \cdot f_t + i_t \cdot \check{C}_t \quad (4)$$

$$o_t = \sigma(W_0 [H_{t-1}, x_t] + b_0) \quad (5)$$

$$h_t = o_t \cdot o(c_t) \quad (6)$$

where:
- $x_t$ is the input sequence (vector) in at time epoch t, which constitutes the n previous samples.
- $C_t$ is the new LSTM state at time epoch t, and depends on prior state and input.
- $H_t$ is the output for time epoch t, which is dependent on $C_{t-1}$ and $x_t$.
- $i_t$, $f_t$, $o_t$ are input, forget, and output gate sub-tensors for time epoch t.
- $\check{C}_t$ is new cell candidate in input sequence at t.
- b is bias for appropriate input sub-tensor.
- $W_i$, $W_o$, and $W_{\check{C}}$ are the weight vectors for the three LSTM layers, respectively. They are determined through training.

First, the forget gate determines what information is to be discarded based on $H_{t-1}$ and the input vector, i.e., samples, and generates the output $f_t$. Then, the memory gate decides on what to store in the cell state. The input gate subtensor calculates the new value of i, while the tanh layer creates a vector of new candidate values, $\check{C}_t$, to be included in the state. The new value of the state is the aggregation of the previous state multiplied by the forget gate output and add $i_t \times \check{C}_t$. We need to decide the output based on filtered cell state. To do so, we use a sigmoid layer to determine the parts of the cell state to output. Then, we pass the cell state through tanh and multiply it by the output of the sigmoid gate, so that we only output the relevant parts.

In an embodiment, both the wearable sensor and the gateway node have the same LSTM architecture. The wearable sensor captures the sample of the waveform for a given snapshot (time window) whose length depends on the buffering size and the tolerable reporting delay by the application, as discussed in the next section. For each snapshot, the wearable device predicts the next sample using LSTM, based on the previous n previous samples in the time series, regardless whether these samples were reported (actual) or predicted. When the prediction matches the actual value or falls within some acceptable difference interval based on the specific sensor modality, the sample is not sent to the gateway. Otherwise, the sample will be scheduled for transmission based on our packet formation algorithm described in the next.

Figure 4:
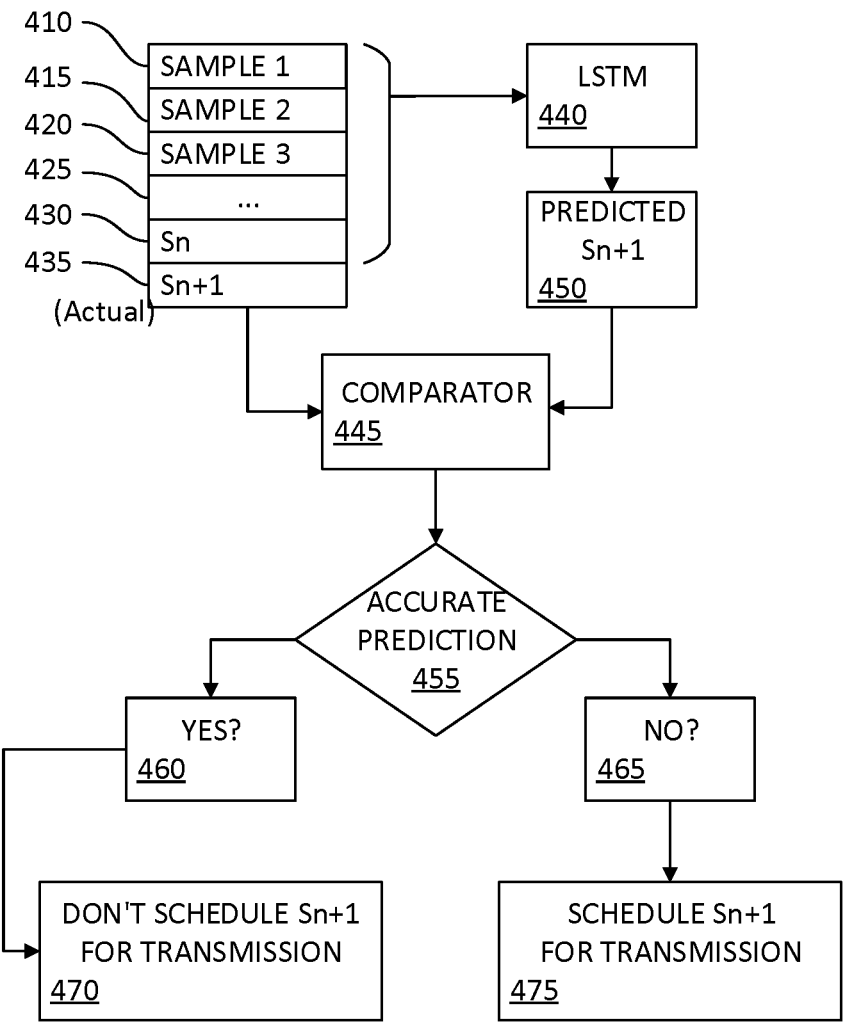
FIG. 4 is a block diagram illustrating the sample prediction and elimination processes at a sensor, according to an embodiment.

FIG. 4 depicts how samples are either scheduled for transmission or skipped, according to an embodiment. The samples 410, . . . 430 are consecutive samples captured or predicted at a sensor. These samples are input to the LSTM 440, yielding a prediction for the next sample 450. Meanwhile the actual next sample 435 is captured. The actual next sample 435 is compared with the predicted next sample 450 using comparator logic 445. If the prediction is accurate within a predetermined tolerance (460), then the actual next sample 435 is not scheduled for transmission (470). If the prediction is not accurate within the predetermined tolerance (465), the actual next sample 435 is scheduled for transmission (475).

Figure 5:
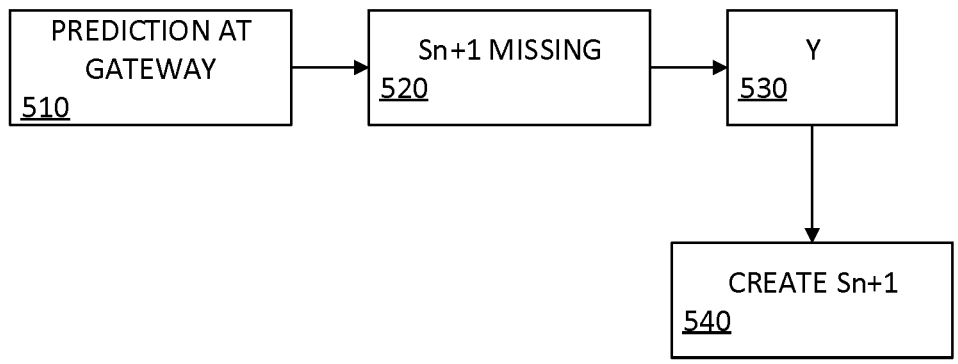
FIG. 5 is a block diagram illustrating creation of an eliminated sample at a gateway, according to an embodiment.
Figure 6:
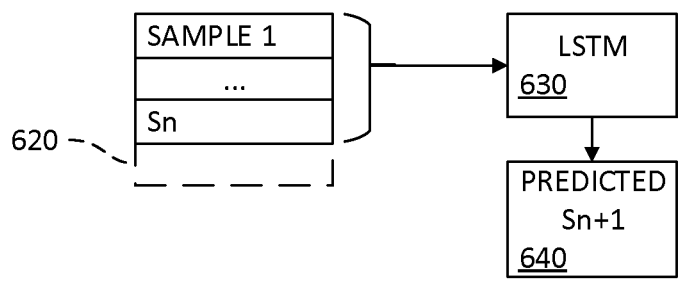
FIG. 6 is a block diagram illustrating the prediction process at a gateway, according to an embodiment.

By running the same LSTM logic, the gateway can estimate the samples that are eliminated by the sensor. FIG. 5 depicts the process of the prediction at the gateway. At 510 the gateway performs a prediction process analogous to that performed at the sensor. A sequence of received samples is considered and a determination 520 is made as to whether a sample ($S_{n+1}$) is identified as missing. The indication to the gateway of a missing sample will be detailed below. If it is in fact deemed missing (530) then the gateway will create $S_{n+1}$ at 540 in the same manner as the sensor. This creation of an eliminated sample is shown in FIG. 6 according to an embodiment. The samples 620 are received and then go through the LSTM process 630 and yield a predicted $S_{n+1}$ 640.

The LSTM is device dependent and is trained accordingly. Using physiological signals, we collect samples over time. The collected samples serve as a training dataset where each sample is labeled with the corresponding timestamp. The LSTM correlates each sample $S_k^t$ at time t for device k with the previous n samples ($s_k^{t-n} \ldots s_k^{t-1}$) and determined the weights for the deep network.

Packet Formation Optimization

To take advantage of skipping the transmission of some samples, the gateway ought to know what sample has been eliminated. The gateway can then apply the LSTM model and estimate the eliminated sample. In an embodiment, each packet from a sensor node should provide information to indicate the order (sequence number) of the samples that are included. Incorporating such information introduces additional overhead and should be thus optimized. In addition, a packet typically consists of two parts, namely, header and payload. In almost all protocols, such as Zigbee and Bluetooth, the header size is usually constant regardless how big the payload is. In practice, the payload size is capped based on the medium access control protocol and the condition of the wireless channel. Thus, it is desirable to pursue the maximum packet size and pack as many samples as possible in each packet while avoiding unutilized space in the payload, e.g., the remaining bit capacity in the payload that is not sufficient for fitting a data sample.

Sample Packing Optimization

Let S be the number of bits needed for a sample. Generally, S depends on the range of the data values and fundamentally depends on the sensing modality. Let $P_{max}$ be the largest allowed payload in bits, which corresponds to the maximum packet size for the underlying communication protocol. Since some samples are skipped in SPEO, a sequence indicator I for each sample needs to be provided in the packet so that the gateway knows what samples are included and what samples are to be estimated using the LTM model. Such an indicator normally would not be necessary if all samples are sent. Thus, the total number of required indicator bits will be (M×I), where M is the number of samples in the packet. Thus, for any packet:

$$P_{max} \geq M \times I + M \times S \qquad (7)$$

To be able to pack multiple samples per packet, samples need to be buffered. We refer to the time window corresponding to multiple samples as a snapshot, denoted as T, and is measured in terms of the number of samples covered by the time window. The objective of the optimization is to find T to minimize the packet count N for sending the samples, keeping in mind that some of the T samples may be skipped. Sample buffering may impose delivery latency for the sensor data. Usually such a latency should be capped, which will constrain the size of the snapshot. Assuming that a sensor generates a sample every t time units, i.e., the sampling rate is 1/τ, and that the maximum tolerable delay in sending a sample is Δ, the snapshot T should not exceed $\lfloor \Delta/\tau \rfloor$. Assuming a relatively large A and unlimited buffer size, we can determine the optimum number of data packets that fully utilize $P_{max}$ within each packet. However, a wearable sensor node typically has limited onboard memory and thus T is also constrained by the available buffering space B. Thus, the optimization problem can be mathematically specified as follows:

Minimize T, N and W according to the following constraints.

The total size for all transmitted samples and the corresponding overhead should not exceed the maximum combined data capacity of the N packets, i.e., $$N \geq \frac{\sum_{0 < i \leq N}(M_i \times I + M_i \times S)}{P_{max}} \qquad (8)$$

The samples and overhead with each individual packet should be less than maximum allowed by the communication protocol.

$$P_{max} \geq \max_{0 < i \leq N}(M_i \times I + M_i \times S) \qquad (9)$$

Leaving out unutilized space with a packet should be avoided. Such utilized space, W, is to be minimized and is calculated by:

$$W = P_{max} - \max_{0 < i \leq N}(M_i \times I + M_i \times S) \qquad (10)$$

The snapshot is constrained by the timeless requirement of the application and the buffer space availability onboard a sensor. The total number of sent samples will be at most equal to the snapshot size if no sample can be predicted and skipped.

$$T \leq \lfloor \Delta/\tau \rfloor \qquad (11)$$

$$T \leq B \qquad (12)$$

$$T \geq \Sigma_{0 < i \leq N} M_i \qquad (13)$$

Before discussing the solution of the abovementioned optimization, we analyze how to note the sequence and missing samples in the packet. If I is taken to be the sample sequence number, a total of (M×I) bits will be needed. Assume that a total of Q samples are covered by a packet, i.e., both included and skipped samples. In such case, I will be $\log_2 Q$ since we have to factor in the number of skipped samples and not only the M that are included in the packet. Thus, the overhead for adding the sample sequence number in the packet will be (M $\log_2$ Q).

Figure 7:
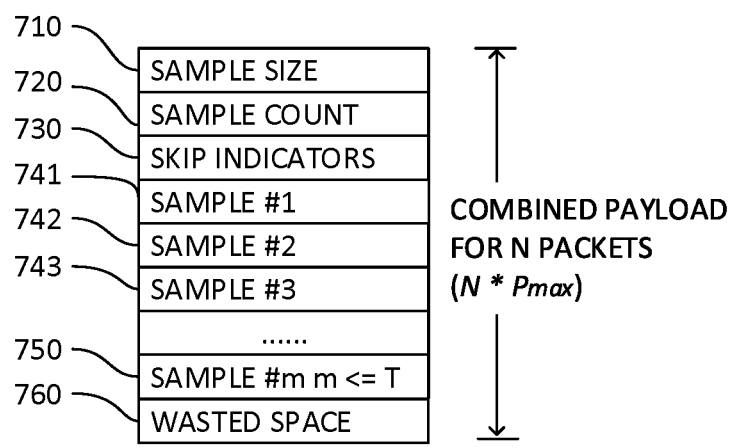
FIG. 7 shows a format for a combined payload, according to an embodiment.

Instead, SPEO pursues a better representation, shown in FIG. 7 according to an embodiment, where the packet payload is to have fields for: (i) the number of samples, Q, covered by the packet (720), and (ii) a skip indicator field 730 containing a bit for each of the Q samples, where the bit will be set to one only if the sample is included, i.e., M out of the Q bits will be ones. For example, assume a packet covers 10 samples of which #1, 2, 5, 6, 7, 9, and 10, are included in the payload, i.e., Q=10. In that case, the indicator overhead consists of 4 bits for reporting the sample count and 10 bits provided with the value 1100111011, reflecting the included and skipped samples, such that the least significant bit corresponds to the first sample and most significant bit is for the last sample. On the other hand, using sample sequence numbers will imply 28 bits.

The format shown in FIG. 7 may also include a sample size field 710 indicating the size of each sample, the sample themselves 741 . . . 750, and any remaining space 760. A person of ordinary skill in the art will recognize that other arrangements of the illustrated combined payload are possible, consistent with the goals of the invention.

SPEO applies an additional optimization to minimize wasted space and facilitate parsing the packets by the gateway. Basically, the combined payload of the N packets is first formed and may then be split among the individual packets. In other words, the samples along with the necessary overhead are first packed in $N \times P_{max}$ bits. The rationale is that Eq. (10) above can still yield wasted space up to (S−1) bits per packet. Considering the samples of a snapshot collectively will enable bringing the average wasted space per packet to a maximum of (S−1)/N. In the format of FIG. 7, the sample size 710 is set to S unless optimized quantization is possible, as discussed in the next subsection. The sample count 720 equals the number of samples, m, among a snapshot T that cannot be skipped. Thus, this field will have $\lceil \log_2 T \rceil$ bits in the worst case where no sample could be correctly predicted. The skip indicator field 730 has one bit for each of the T samples. The remaining space is solely used for the data samples. Once formed, such a payload will be divided among the N packets and re-combined at the gateway to be decoded and retrieve the data samples. Thus, Eq. (9) and (10) above are replaced by:

$$W=[N \times P_{max}-(\lceil \log_2 S \rceil +T+\lceil \log_2 T \rceil)-T \times S]/N \quad (14)$$

It is worth mentioning that SPEO assumes guaranteed packet delivery, e.g., by using acknowledgements, and thus the gateway will not miss the transmitted samples. We also note that the snapshot size T is not fixed and will be a function of the success of the LSTM model in predicting samples. Therefore, SPEO will keep buffering samples and until we find an optimal T that minimizes N and W. Upon transmission of the N packets, the process is repeated again for the next T. In other words, SPEO applies a heuristic to solve the multi-objective optimization. We also note that the value of S in Eq. (14) will be subject to optimization as we explain next.

Sensor Sample Quantization

The binary representation of floating-point numbers can be subject to a tradeoff between length and precision. The number of bits S for representing a data sample generally depends on the sensor modality and the required precision. In essence, determining S is a quantization process for an analog signal that opts to enable reconstructing the signal of the various digitized samples such that key properties such as peaks, oscillations, etc., are preserved. Reducing S not only limits the buffer size requirement, but also cuts the communication overhead in terms of bandwidth and energy (Ali et al. 2019). Basically, more samples can be included in a packet if fewer bits per sample are used. In case of SPEO, the quantization factors in the precision of the predicted samples at the gateway. In other words, the value of S should not only preserve the sensor signal properties when reconstructed at the gateway node, but also enable the gateway to accurately estimate the skipped samples.

While the quantization accuracy can be set based on the specific signal, e.g., ECG, SPEO exploits possible reduction of S, per the individual snapshots. The rationale is that determining S is in essence a data-driven process and thus the value of S can be adaptively set based on the signal properties to be preserved. SPEO applies the following:

(1) Denormalized floating point representation is used to sustain maximum precision. To enable doing so, the entire dataset is biased based on the range of values. For example, ECG signals are usually in the millivolts (mV) range and can be biased by multiplying by 1000 at the sensor nodes to boost accuracy; such a bias becomes implicit where the gateway scales back the date, i.e., divides by 1000, when reconstructing the ECG signal.

(2) A default value of S is determined to maintain clinically acceptable signal reconstruction quality. This depends on the sensor modality.

(3) While determining the snapshot, possible reduction of S is considered for the buffered samples. The reduction is gauged by both the impact on the samples that are to be skipped. If the accuracy does not diminish, i.e., the predicted samples stay below the tolerated error limit, S is decremented. The process is conducted incrementally, consecutive reduction by one bit is considered.

We note that changing S at the sensor side, requires informing the gateway in order for accurate parsing of a transmitted data packet. Thus, we will add overhead bits to inform the gateway on the amount of bits used per sample size, $\gamma$ (see field 710 of FIG. 7). Since $\gamma \leq S$, the number of bits for specifying $\gamma$ is $\lceil \log(S) \rceil$. Overall the quantization-based optimization can yield reduction of payload requirement of $(S-\gamma) \cdot m$, where m is the number of samples that must be transmitted.

The pseudo code of the SPEO algorithm is shown in FIG. 8 according to an embodiment. The algorithm employs greedy heuristics to pack the maximum number of samples in the minimum number of packets. We achieve this by minimizing the average wasted (unutilized) space within the payload of a packet. First, we determine the maximum snapshot size based on the allotted buffer size and the data latency requirement of the application and then iterate over them to accumulate the remaining space in each packet and track the minimum value. The number of samples that corresponds to the minimum wasted space is the best T and the associated packet count is the optimum N. The first three lines are for training the LSTM. Lines 4-10 check whether each sample in the buffer B, can be predicted using the LSTM. Using the maximum buffer size B, we try to find the number of samples corresponding to the least wasted packet space in lines 12-27, according to Eq. (14). Those samples are then used to form the N packets. The loop of lines 19-26 are for applying the optimized sample size quantization process described above.

Validation Experiments

To validate the effectiveness of the above approach, we use a popular dataset from PhysioNet (Novak, et al. 2010). The dataset contains 24 hours ECG and EMG measurements, collected during patient monitoring.

In the validation, we use the data for one patient. We compare the performance of SPEO with a popular compressive sensing technique from the literature (Rajoub 2002). In fact, SPEO is deemed to be complementary, rather than competing, with data compression approaches. The main objective of the comparison is to gauge the effectiveness of SPEO. The validation environment and performance results are discussed in the balance of this section.

Simulation Environment and Experiment Setup

In order to study the performance of SPEO, the dataset is divided into two subsets for supporting the training and test phases. Assuming the current time is t, we want to predict the value at the next time epoch (t+1) given the measurements for current and n previous time epochs. The LSTM is trained for 100 epochs with batch size of 1024 measurements of a single patient. After training LSTM, we extract the parameters of the model, specifically the weights $W_i$, $W_o$, and $W_{\tilde{C}}$. We have experimented with the number of LSTM cells and found the incorporation of 4 cells does yield the best results. We have also evaluated the effect of n, and observed no significant variation of the prediction accuracy when more than three samples are considered. Therefore, the reported results in this section are based on n=3, i.e., the LSTM predicts $s_k^{t+1}$ for a device k using $(s_k^{t-2}, s_k^{t-1}, s_k^t)$.

The maximum payload of the packet is set to 84 bytes for broadcast messages according to the limit imposed by the Digi XBee® 3 ZigBee standard. The performance of SPEO is compared with compressive sensing (Rajoub 2002), which serves as a baseline. Such baseline approach involves computing the wavelet transform and reconstructing the ECG signal using a set of wavelet coefficients. The wavelet coefficients are determined based on confidence interval of 97% for the reconstructed ECG signals. The default window (buffer) size for the compression algorithm is set to 3000 ECG recordings. As noted earlier, SPEO can be viewed as a complementary approach to data compression techniques rather than a competitor. Therefore, we show the performance of the SPEO alone and in conjunction with data compression (baseline). The simulation opts to capture the effect of:

Buffer size: This reflects the number of samples considered in the packet formation optimization.

Tolerable inaccuracy: this is the prediction error threshold, which determines when a sample may be skipped. If the difference between a predicted sample and the actual data exceeds such a threshold, the sample needs to be transmitted.

We measure the effectiveness of SPEO in terms of the following metrics:

The compression ratio: it reflects the percentage of correctly predicted samples among the overall test set.

The number of required data packets: This metric assesses the effectiveness in terms of reduced packet transmissions, which translate to energy saving and bandwidth efficiency.

The cross correlation ratio: This metric opts to capture the effect of inaccuracy caused by sample prediction and quantization by measuring the maximum divergence of the reconstructed signal from the original. To calculate such a measure, we use the cross-correlation function of MATLAB.

Communication Energy: The energy consumption of nodes in the network is mainly due to communication and data processing. Thus, we can define the energy (in joules or J) required for transmission as the change in power $\Delta P$ time's change in time $\Delta t$. This is effectively the sum of the transmission electrical energy $E_{ELEC-TX}$ and the reception energy $E_{ELEC-RX}$, i.e., $$E_{TX} = \Delta P \cdot \Delta t = E_{ELEC-TX} + E_{ELEC-RX} \qquad (15)$$

The Digi XBee 3 ZigBee radios assumed in our simulation have a transmit power of 132 mW and a receive power of 56.1 mW respectively. With each sensor node system having a battery capacity of 400 milliamp-hours (mAh), this equates to an Energy capacity of 1.32 watt-hours (Wh) at 3.3V supply or 4752 in Joules. Thus, for 1 ms of transmission the transmission and reception energy are 0.132 J and 0.056 J respectively.

Simulation Results

Figure 9:
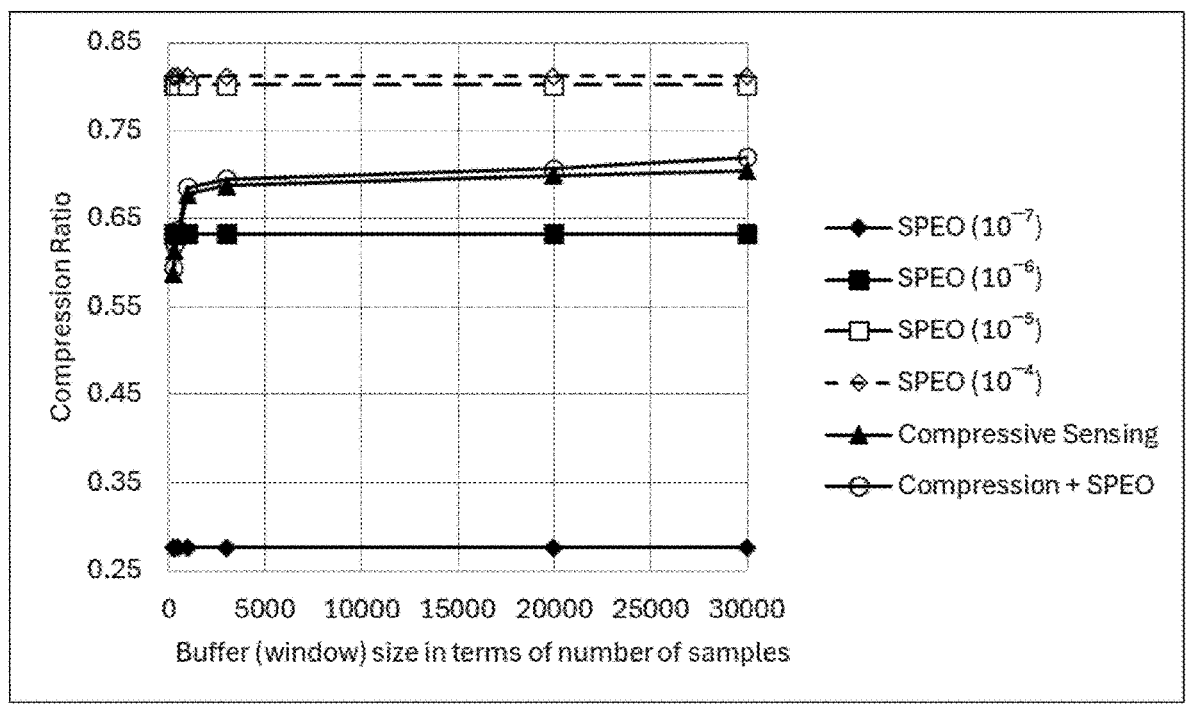
FIG. 9 shows the performance of an embodiment of the invention with respect to information compression.
Figure 10A:
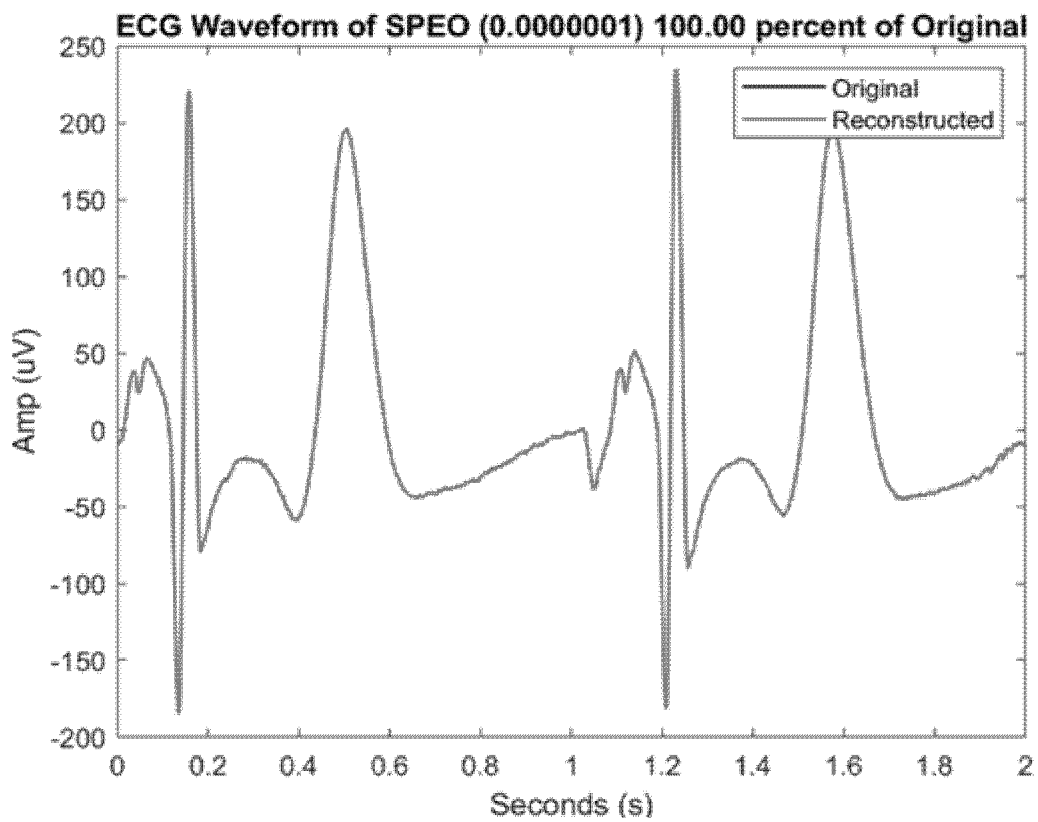
Figure 10B:
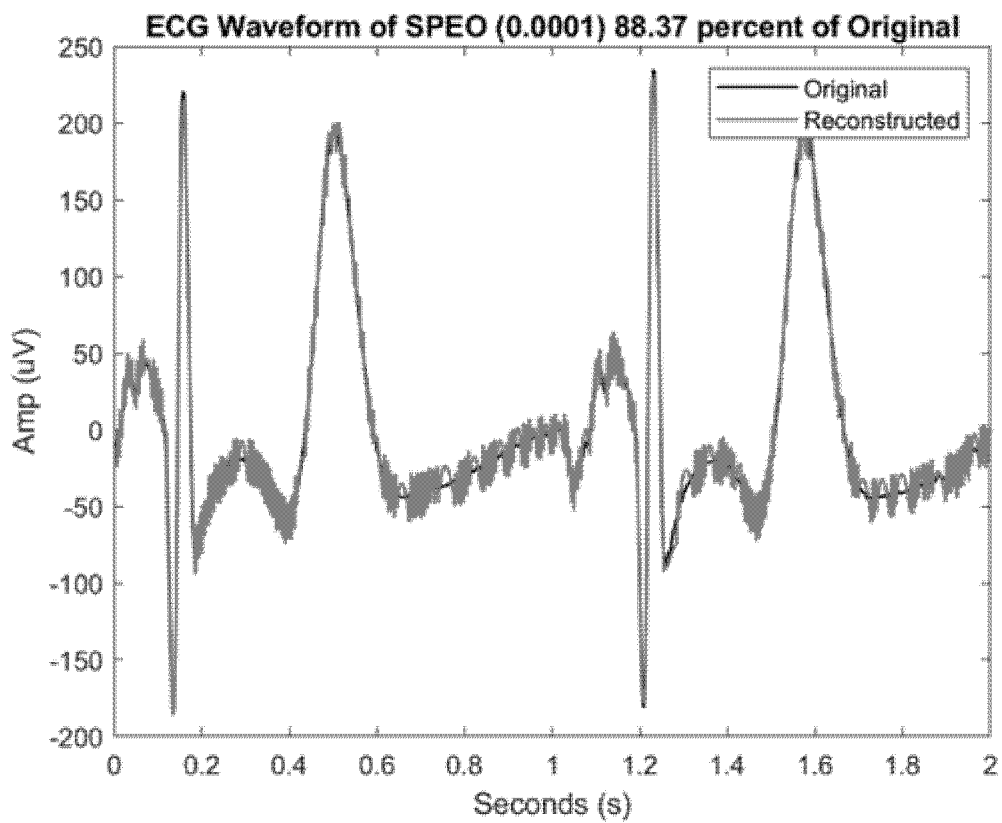

SPEO performance: FIG. 9 reports the achieved compression ratio for SPEO under varying buffer sizes and for four settings of tolerable inaccuracy, namely 10-4, 10-5, 10-6, and 10-7. Note that the original ECG signal also contained motion artifacts as is represented in the fourth peak after the QRS interval, methods, such as (Harshada et al. 2018), suppress such artifacts. In this invention, it was not necessary to do so since SPEO can work for different modalities. The figure also captures the performance of compressive sensing when applied along and in conjunction with SPEO. Overall, increasing the threshold for tolerable errors enables SPEO to skip more samples and achieve high compression ratios. Particularly, requiring the predicted sample to deviate by no more than $10^{-7}$ is quite restrictive and limits compression to only 28%. In fact, the reconstructed ECG signal under $10^{-7}$ accuracy constraint, matches exactly the real ECG signal, as shown in FIG. 10*a*. Tolerating inaccuracy up to $10^{-5}$ boosts the compression effectiveness of SPEO to about 80%, which is quite remarkable. The difference between the performance of $10^{-5}$ and $10^{-4}$ is not much, yet can be leveraged if acceptable to the application, i.e., does not hinder the physician's ability in assessing the patient's condition. FIG. 10*b* shows the reconstructed signal for tolerable inaccuracy of $10^{-4}$, which still resembles the original ECG signal. FIG. 11 compares the quality of the reconstructed signal relative to the original one by showing the cross-correlation ratio. As indicated by the figure, the accuracy requirement affects the quality of the reconstructed signal where an accuracy of up to $10^{-7}$ would ensure exact match, as also demonstrated in FIG. 10*a*. Note that setting the tolerable inaccuracy to $10^{-5}$ is quite effective in terms of compression ratio (FIG. 9) and still achieves very high cross-correlation ratio.

To further confirm the effectiveness of SPEO, we have generated 30 reconstructed ECG signals using SPEO with tolerable inaccuracy of $10^{-5}$, and shown them to two physicians for review. Upon providing the physicians with the original ECG signals, the patterns have been 100% consistent.

Comparison with Compressive Sensing: FIG. 9 also demonstrates the superiority of SPEO relative to contemporary compressive sensing. SPEO distinguishes itself with its ability to leverage application level inaccuracy tolerance. As shown in the figure, with sufficient tolerance SPEO is more effective than compressive sensing. When tolerating inaccuracy up to $10^{-5}$ SPEO outperforms compressive sensing by about 15%. In addition, FIG. 11 shows that the quality of the reconstructed signal in SPEO surpasses that of compressive sensing when the accuracy of predicted samples is high. Such superior quality can also be inferred when comparing the waveforms of FIG. 10*a*, 10*b* and FIG. 11. Again FIG. 9 promotes SPEO with $10^{-5}$ prediction accuracy threshold as the best choice. The results of FIG. 9 also indicate that SPEO is complementary to compressive sensing and can boost its performance, especially for large window sizes. Using both compressive sensing and SPEO with error tolerance of $10^{-6}$, we could achieve the same compression ratio of compressive sensing, yet with reduced loss. To apply the SPEO's sample prediction mechanism over the compressed signal, we have used the LSTM network with the same configuration, despite the fact that it is trained using compressed ECG signals, and predict the compression coefficients.

Quantization performance: Additional testing addresses the number of packets generated by SPEO using fixed and dynamic (optimized) quantization of data samples. The performance is studied for two settings of tolerable sample prediction inaccuracy, namely, $10^{-7}$ and $10^{-5}$. For fixed quantization, the number of bits for representing a sample is set to 32 and 28, for error tolerance of $10^{-7}$ and $10^{-5}$, respectively. These settings reflect the least value of S for the considered ECG dataset and accuracy requirements. With fixed quantization, the size of Sis assumed to be known to the gateway by default and is not thus included in the packet. For the dynamic quantization configuration, control information is further included in packets to indicate the number of bits used for quantization, as explained in Section 5. We vary the size of the buffering window and compare the number of packets generated.

As seen in the figure, the dynamic quantization setting decreases the packet count by about 10% and 5% for error tolerance $10^{-7}$ and $10^{-5}$, respectively. Obviously, the drop in packet count is due to the use of fewer bits to represent data samples. The impact of dynamic quantization is less in the case of $10^{-5}$ accuracy, since the fixed setting is 28 bits, which is already small. In addition, for the case of $10^{-7}$ the number of predicted samples are much less than when more error tolerance is allowed in the $10^{-5}$ configuration, and consequently there are more samples to transmit and benefit from quantization optimization. Finally, we note that the increased buffer size has a positive impact on the number of packets, mainly due to the increased flexibility in packet formation, as noted in Section 5, and the increased compression ratio, as indicated by FIG. 6. It is worth mentioning that the effect of growing the buffer size diminishes after 1000, since the optimal snapshot Tis reached and stays unchanged as long as it is less than the buffer size.

Finally, FIG. 13 captures the power savings due to reduced data transmission and optimized quantization. The results confirm the effectiveness of SPEO. Overall, SPEO achieves dramatic power savings, indicating that more than 6 times reduction in communication energy could be made when applying SPEO with tolerable accuracy of $10^{-5}$. It is worth emphasizing that SPEO may not be an alternative to compressive sensing and can both be applied, where combining compressive sensing with SPEO (accuracy of $10^{-7}$) yields performance that surpass each of them individually.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

REFERENCES

Abiodun, A. S., Anisi, M. H., Ali, I., Akhunzada, A. and Khan, M. K. (2017). Reducing Power Consumption in Wireless Body Area Networks: A Novel Data Segregation and Classification Technique. IEEE Consumer Electronics Magazine, 6, 4, 38-47.

Abrishami, H., Campbell, M., Han, C., Czosek, R., & Zhou, X., (2018). P-QRS-T localization in ECG using deep learning. In the Proc. IEEE EMBS International Conference on Biomedical & Health Informatics (BHI). (pp. 210-213).

Al Disi, M., et al. (2018). ECG Signal Reconstruction on the IoT-Gateway and Efficacy of Compressive Sensing Under Real-Time Constraints. IEEE Access, 6, 69130-69140.

Ali, M., Moungla, H., Younis, M., & Mehaoua, A. (2019). Interference Mitigation Techniques in Wireless Body Area Networks. Book Chapter, The Philosophy of Mission-Oriented Wireless Sensor Networks, Ed. Habib Ammari, Springer.

Bianchi, F. M., Maiorino, E., Kampffmeyer, M. C., Rizzi, A. & Jenssen, R., (2017). Recurrent Neural Networks for Short-Term Load Forecasting. SpringerBriefs in Computer Science.

Dehkordi, S. A., et al. (2020). A survey on data aggregation techniques in IoT sensor networks. Wireless Networks, 26, 1243-1263.

Djelouat, H., Amira, A., & Bensaali, F. (2018). Compressive Sensing-Based IoT Applications: A Review," *Journal of Sensor and Actuator Networks*, Vol. 7, No. 4, pp. 45-75, October 2018.

Djelouat, H., et al., (2020). Real-time ECG monitoring using compressive sensing on a heterogeneous multicore edge-device. Microprocessors and Microsystems, 72, #102839, 2020.

Gradl, S., Kugler, P., Lohmüller, C., & Eskoer, B. (2012), Real-time ECG monitoring and arrhythmia detection using Android-based mobile devices. In Proc. 34th IEEE Annual International Engineering in Medicine and Biology Conference (EMBC). (pp. 2452-2455).

Harshada, C., Patil N., & Sinha, V. (2018). Online Suppression of Motion Artifacts during Treadmill ECG. International Journal of Engineering Science and Computing.

Kanoun, K., Mamaghanian, H., Khaled, N. & Atienza, D. (2011). A real-time compressed sensing-based personal electrocardiogram monitoring system. In Proc. Design, Automation Test in Europe (DATE 2011).

Karray, F., Jmal M. W., Garcia-Ortiz, A., Abid, M., & Obeid, A. M. (2018). A comprehensive survey on wireless sensor node hardware platforms. Computer Networks, 144, 89-110.

Khosravy, M., & Duque, N. D. C. (2020). Compressive Sensing in Health Care, 1st Edition. Academic Press.

Moustafa, H., Schooler, E. M., Shen, G., & Kamath, S. (2016). Remote monitoring and medical devices control in eHealth. In the Proc. 12th International Conference on Wireless Mobile Computing, Network, and. Communication (WiMob).

Nadeem, A., Hussain, M. A., Owais, O., Salam, A., Iqbal, S., & Ahsan, K. (2015). Application specific study, analysis and classification of body area wireless sensor network applications. Computer Networks, 83, 363-380.

Novak, V., et al. (2010). Cerebral flow velocities during daily activities depend on blood pressure in patients with chronic ischemic infarctions. Stroke—A Journal of Cerebral Circulation, 41, 1, 61-66.

Qaisar, S., Bilal, R. M., Iqbal, W., Naureen, M. & Lee S. (2013). Compressive sensing: From theory to applications, a survey. Journal of Communications and Networks, 15, 5, 443-456.

Rahmani, A. M., et al., (2018). Exploiting smart e-health gateways at the edge of healthcare Internet-of-Things: A fog computing approach. Future Generation Computer Systems, 78, 641-658.

Rajoub, B. (2002). An efficient coding algorithm for the compression of ECG signals using the wavelet transform," IEEE transactions on bio-medical engineering, Vol. 49, pp. 355-362.

Riazul Islam, S. M., Kwak, D., M. Humaun Kabir, Hossain, M., & Kwak, K.-S. (2015). The Internet of Things for health care: A comprehensive survey. IEEE Access, 3, 678-708.

Wu, Z., Ding, X., Zhang, G., Xu, X., Wang, X., Tao, Y., & Ju, C. (2016). A novel features learning method for ECG arrhythmias using deep belief networks. In Proc. IEEE 6th International Conference on Digital Home (ICDH). (pp. 192-196).

Yıldırım, Ö., Tan, R. S., & Acharya, U. R. (2018). An Efficient Compression of ECG Signals Using Deep Convolutional Autoencoders. Cognitive Systems Research. 52, 198-211.

Zemouri, R., Zerhouni, N., & Racoceanu, D. (2019). Deep Learning in the Biomedical Applications: Recent and Future Status. Applied Sciences, 9, 8, 1526.

Zhang Z. & Rao, B. D. (2013). Extension of SBL algorithms for the recovery of block sparse signals with intra-block correlation. IEEE Trans. on Signal Processing, 61, 8, pp. 2009_2015, April 2013.

What is claimed is:

1. A body area sensor network apparatus comprising:
a mesh of sensors that are networked and that are each configured to sample data related to one or more of full range of motion, muscle activation, and body vitals, creating a set of samples at each sensor;
wherein each sensor is configured to reduce the number of its samples by eliminating predictable samples in the set of samples, producing a set of remaining samples;
wherein each sensor is further configured to pack the set of remaining samples into a minimized combined payload;
wherein each sensor is configured to transmit the minimized combined payload; and
wherein the packing of the set of remaining samples comprises:
forming the minimized combined payload comprising the following fields:
a sample size specifying a number of bits in each sample in the minimized combined payload;
a sample count specifying a number of samples in the minimized combined payload;
a skip indicator field specifying which samples are eliminated and which samples are remaining samples; and
a plurality of remaining samples where eliminated samples are absent.

2. The apparatus of claim 1, wherein the skip indicator field comprises a bit for each sample where:
the bit is 1 if the sample is a remaining sample in the combined payload, and 0 if the sample is eliminated from the minimized combined payload.

3. The apparatus of claim 1 wherein the minimized combined payload represents a snapshot of T consecutive samples, wherein T is optimized to minimize N and W in the equation $$W = [N \times P_{max} - (\lceil \log_2 S \rceil + T + \lceil \log_2 T \rceil) - T \times S]/N$$

where
W is an amount of utilized space,
N is a packet count,
$P_{max}$ is a largest allowed payload, and
S is a number of bits needed per sample.

4. The apparatus of claim 1 wherein a size of a sample is minimized adaptively while preserving precision of a signal represented by the sample.

5. The apparatus of claim 4 wherein the sample size minimization comprises denormalizing a floating point representation of the signal.

* * * * *